(12) United States Patent
Eisenkot et al.

(10) Patent No.: US 11,558,408 B2
(45) Date of Patent: Jan. 17, 2023

(54) ANOMALY DETECTION BASED ON EVALUATION OF USER BEHAVIOR USING MULTI-CONTEXT MACHINE LEARNING

(71) Applicant: EMC IP Holding Company LLC, Hopkinton, MA (US)

(72) Inventors: Guy Eisenkot, Herzeliya (IL); Martin Rosa, Quebec (CA); Lior Govrin, Tel-Aviv (IL); Yaron De Levie, Kfar Yehoshua (IL); Maria Oks, Holon (IL); Miri Weissler, Kiryat Ye'arim (IL); Barak Schoster, Rishon le Zion (IL); Shay Menaia, Ganei Tiqva (IL); Yuval Shachak, Ness Ziona (IL); Ana Paskal, Rishon LeTsiyon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 589 days.

(21) Appl. No.: 16/402,500

(22) Filed: May 3, 2019

(65) Prior Publication Data
US 2020/0351285 A1    Nov. 5, 2020

(51) Int. Cl.
*H04L 9/40*    (2022.01)
*G06N 20/00*    (2019.01)

(52) U.S. Cl.
CPC ...... *H04L 63/1425* (2013.01); *H04L 63/1433* (2013.01); *H04L 63/1441* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,756,684 | B2 * | 6/2014 | Frantz | H04L 63/1441 726/22 |
| 9,021,583 | B2 * | 4/2015 | Wittenstein | H04L 63/1425 726/22 |
| 9,112,895 | B1 * | 8/2015 | Lin | H04L 63/1425 |
| 9,189,623 | B1 * | 11/2015 | Lin | G06F 21/56 |
| 9,516,053 | B1 * | 12/2016 | Muddu | H04L 63/1433 |
| 10,645,109 | B1 * | 5/2020 | Lin | G06F 16/285 |
| 11,055,405 | B1 * | 7/2021 | Jin | H04L 63/1425 |

(Continued)

*Primary Examiner* — Khang Do
(74) *Attorney, Agent, or Firm* — Ryan, Mason & Lewis, LLP

(57) ABSTRACT

Methods, apparatus, and processor-readable storage media for evaluating cyber attacker behavior using machine learning to identify anomalies are provided herein. An example method includes obtaining, based on events associated with changes in one or more of a registry and a computer process, baseline models comprising a user context representing normal behavior for a first subset of features associated with the events with respect to a given user, an inverse context that represents normal behavior for at least one feature with respect to a particular value of one or more features in the first subset, and a global context representing a behavior of the features across the plurality of users; detecting a new event attributable to the given user; calculating a score for the new event using one or more of the baseline models; and determining that the new event is an anomaly in response to the score satisfying a threshold.

20 Claims, 8 Drawing Sheets

(56) References Cited

U.S. PATENT DOCUMENTS

| | | | |
|---|---|---|---|
| 2011/0231361 A1* | 9/2011 | Patchava | G06F 21/577 |
| | | | 707/602 |
| 2012/0005542 A1* | 1/2012 | Petersen | H04L 63/1425 |
| | | | 714/48 |
| 2013/0055385 A1* | 2/2013 | Antony | G06F 21/552 |
| | | | 726/22 |
| 2016/0352775 A1* | 12/2016 | Naveh | H04L 63/1458 |
| 2017/0083815 A1* | 3/2017 | Sanchez Charles | G06F 21/552 |
| 2017/0126710 A1* | 5/2017 | De-Levie | H04L 63/1425 |
| 2017/0171229 A1* | 6/2017 | Arzi | H04L 63/1408 |
| 2018/0270261 A1* | 9/2018 | Pande | H04L 63/1425 |
| 2019/0108114 A1* | 4/2019 | De Vansa Vikramaratne | G06F 21/6209 |
| 2019/0108340 A1* | 4/2019 | Bedhapudi | G06F 16/1734 |
| 2019/0166144 A1* | 5/2019 | Mirsky | G06N 7/005 |
| 2020/0019635 A1* | 1/2020 | Poirel | G06F 16/215 |
| 2020/0045066 A1* | 2/2020 | Meng | H04L 63/1416 |
| 2020/0076839 A1* | 3/2020 | Luiggi | H04L 63/1433 |
| 2020/0120122 A1* | 4/2020 | Du | H04W 4/70 |
| 2020/0184051 A1* | 6/2020 | Toth | G06F 21/32 |
| 2020/0267146 A1* | 8/2020 | Nambiar | G06N 20/00 |
| 2020/0285737 A1* | 9/2020 | Kraus | G06F 21/554 |
| 2020/0296124 A1* | 9/2020 | Pratt | H04L 63/1416 |
| 2021/0286874 A1* | 9/2021 | Jin | G06F 21/552 |
| 2021/0328969 A1* | 10/2021 | Gaddam | H04L 63/1425 |
| 2022/0083646 A1* | 3/2022 | Traktirnik | G06F 21/83 |

* cited by examiner

ANOMALY DETECTION BASED ON EVALUATION OF USER BEHAVIOR USING MULTI-CONTEXT MACHINE LEARNING

FIELD

The field relates generally to information processing systems, and more particularly to techniques for providing security in such information processing systems.

BACKGROUND

Computer networks, such as corporate Information Technology (IT) networks, are becoming more vulnerable as they evolve. Traditional perimeter defenses for corporate IT networks are failing at an increasing rate such that many cyber security practitioners assume that skilled attackers can easily infiltrate and gain an initial foothold in a modern corporate network. Additionally, attackers are now leveraging existing controls available in commercial products to execute "file-less" attacks (also referred to as "living-off-the-land" attacks), wherein the attackers gain control and manipulate systems remotely without installing any malicious files.

A need exists for improved techniques for evaluating cyber attacker behavior and for identifying anomalies based on the evaluation.

SUMMARY

One computer-implemented method includes obtaining, based on a plurality of events associated with changes in one or more of a computer registry and a computer process, a plurality of baseline models comprising (i) a user context that represents normal behavior for at least a first subset of features associated with the plurality of events with respect to a given one of a plurality of users, (ii) at least one inverse context that represents normal behavior for at least one of the features with respect to a particular value of one or more features in the first subset, and (iii) a global context representing a behavior of the features across the plurality of the users; detecting at least one new event attributable to the given user; calculating a score for the at least one new event based at least in part on a comparison of the at least new one event to one or more of the baseline models; determining that the at least one new event is an anomaly in response to the score satisfying a threshold; and initiating one or more remedial actions responsive to the determining.

Illustrative embodiments can provide significant advantages relative to conventional traditional security tools and techniques. For example, challenges associated with identifying subtle nuances in user behavior that could indicate, for example, that a user account is being controlled by an attacker are overcome by applying user-centric detection techniques aimed at automating the process of behavior recognition.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices. Illustrative embodiments of the disclosure provide methods, apparatus and computer program products for evaluating cyber attacker behavior using machine learning to identify anomalies.

Figure 1:
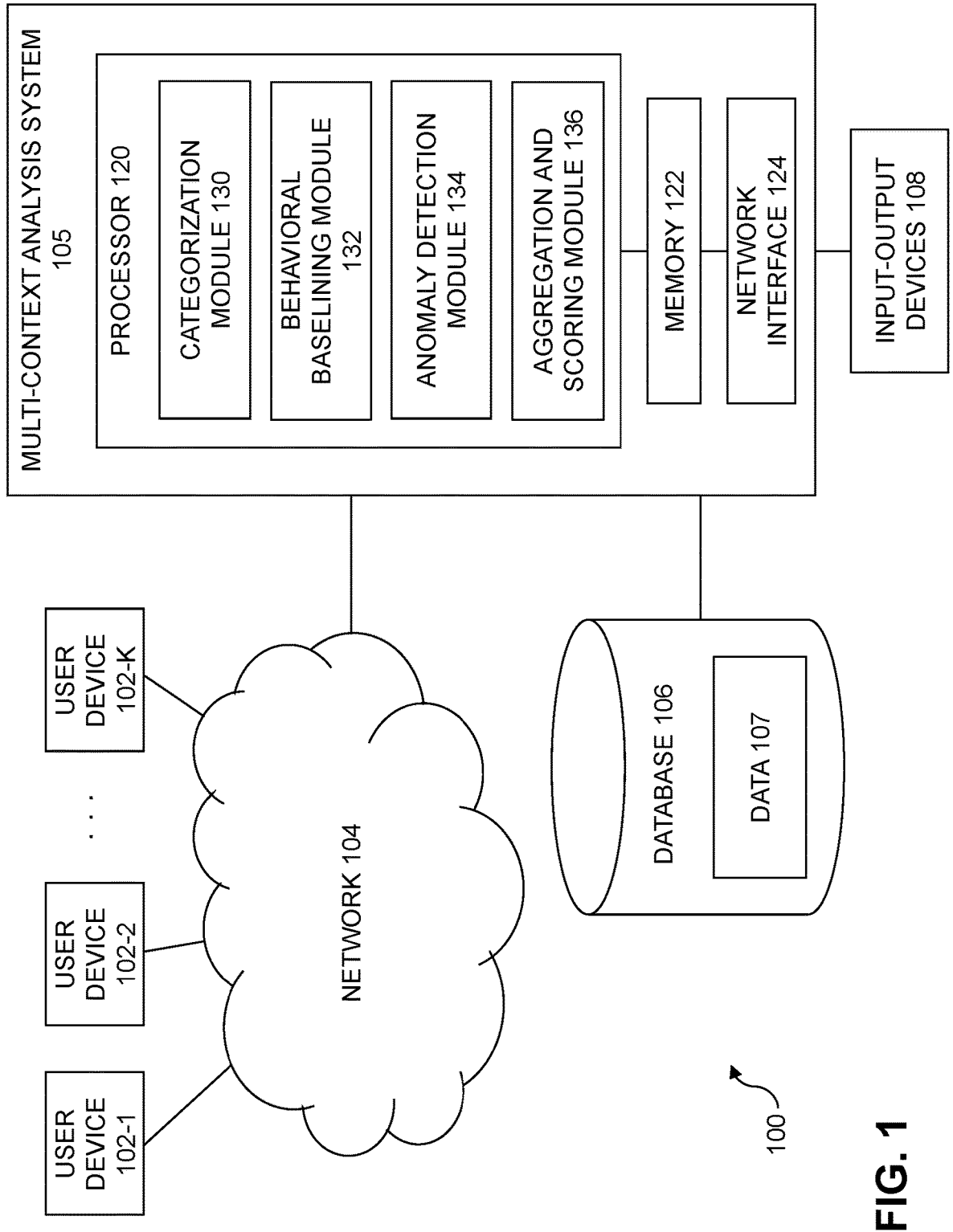
FIG. 1 shows an information processing system configured for detecting cyber attacker behavior in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a multi-context analysis system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the user devices 102 (or the multi-context analysis system 105) can have an associated database 106 configured to store data 107 pertaining to information for detecting anomalies, which may comprise, for example, data relating to one or more of rules for categorizing registry and/or process events and multi-contextual behavioral baselines (as further detailed herein).

The database 106 in the present embodiment is implemented using one or more storage systems associated with user devices 102 (or the multi-context analysis system 105). Such storage systems can comprise any of a variety of different types of storage including network-attached storage (NAS), storage area networks (SANs), direct-attached storage (DAS) and distributed DAS, as well as combinations of these and other storage types, including software-defined storage. Also associated with one or more of the user devices 102 (or the multi-context analysis system 105) are input-output devices 108, which illustratively comprise keyboards, displays or other types of input-output devices in any combination. Such input-output devices can be used, for example, to support one or more user interfaces to user devices 102 (or the multi-context analysis system 105), as well as to support communication between user devices 102 (or the multi-context analysis system 105) and other related systems and devices not explicitly shown.

Each user device 102 (or the multi-context analysis system 105) in the FIG. 1 embodiment is assumed to be implemented using at least one processing device. Each such processing device generally comprises at least one processor and an associated memory, and implements one or more functional modules for controlling certain features of the user device 102 (or the multi-context analysis system 105).

More particularly, user devices 102 (or the multi-context analysis system 105) in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the user devices 102 (and/or multi-context analysis system 105) to communicate over the network 104 with other user devices 102 (and/or the multi-context analysis system 105), and illustratively comprises one or more conventional transceivers.

The processor 120 further comprises a categorization module 130, a behavioral baselining module 132, an anomaly detection module 134 and an aggregation and scoring module 136, each discussed further below in conjunction with FIGS. 2 and 4.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the modules 130, 132, 134 and 136 may be implemented at least in part in the form of software that is stored in memory 122 and executed by processor 120.

It is to be understood that the particular set of elements shown in FIG. 1 for evaluating cyber attacker behavior using machine learning to identify anomalies involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 130, 132, 134 and 136 of an example user device 102 (or the multi-context analysis system 105) in computer network 100 will be described in more detail with reference to the flow diagram of FIG. 4.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The user device 102 can also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As noted above, traditional perimeter defenses for corporate IT networks are failing at an increasing rate and it is assumed that skilled attackers can easily infiltrate and gain an initial foothold in these networks. Existing security tools and techniques primarily focus on identifying how an attacker gains this initial foothold and how it manifests over time but generally do not account for the human behavior behind these activities. Unlike machines, human adversaries are more unpredictable as they are capable of, for example, improvising and taking shortcuts. Additionally, traditional security tools (such as, for example, anti-virus and intrusion-detection-systems) are not well-suited for identifying attacks file-less attacks.

In general, existing techniques attempt to utilize data, apply analytics, and use combinations of rules, heuristics, statistical and mathematical approaches to identify specific types of behaviors previously attributed to attackers. Some techniques suggest a use-case driven approach and tailor specific sets of techniques to identify a single behavior, while others offer a more holistic view that attempts to identify hard-to-define and unknown threats.

Some examples of existing techniques include: agent-based endpoint protection technology (e.g., Endpoint Protection Platforms (EPP) and/or Endpoint Protection and Response Platforms (EDR)); deception technology; and SIEM (Security Information and Event Management) and UEBA (User and Entity Behavior Analytics) products. However, each of these techniques suffers from one or more disadvantages.

Agent-based endpoint protection technology relies on a strong data presence on workstations, servers or virtual machines to gather rich data that describes all the activity on a host. Depending on the type of collection methods, these agents pull in valuable raw data and apply a wide range of techniques to detect attacker behaviors. However, these technologies do not, e.g., generate a user-centric analysis (i.e., an analysis focused on a user's angle of the data) as most of these technologies are deeply invested in a host- or file-centric analysis. Further, these technologies generally rely on labeled data to conduct supervised learning. In some cases, this can provide a good outcome (such as in malware detection, for example), but it is a much harder challenge to detect user-behavior across environments and in scale.

Deception technology focuses on collecting data from 'honeypots' deployed for short and long periods of time. These honeypots lure attackers in an attempt to compromise them. Deception technology does not provide coverage to all users in the network but focuses on generating appealing targets for attackers that will eventually enable them to identify an attacker's behavior. Accordingly, deception technology products do not provide a data pipeline that would allow analysis of all user-centric behavior originating from all hosts to identify human attacker behaviors.

SIEM and UEBA products provide various aspects of analytics but require complex machine learning models and complex data pipelines to be able to perform this type of analysis in scale. Accordingly, these technologies generally do not have complete control of an endpoint's collection logic, thus making them unfit to build a complete attacker-centric human behavioral model.

Example embodiments of the subject matter described herein provide a scalable and efficient detection framework that is capable of identifying subtle nuances in user behavior that could indicate, for example, a user account is being controlled by an attacker. In at least one example embodiment, a detection framework analyzes user-centric behavior originating from all hosts to identify human attacker behavior through a combination of high-fidelity data ingestion, robust multi-tiered analytics, and unsupervised machine learning technology learns from prior experiences.

Figure 2:
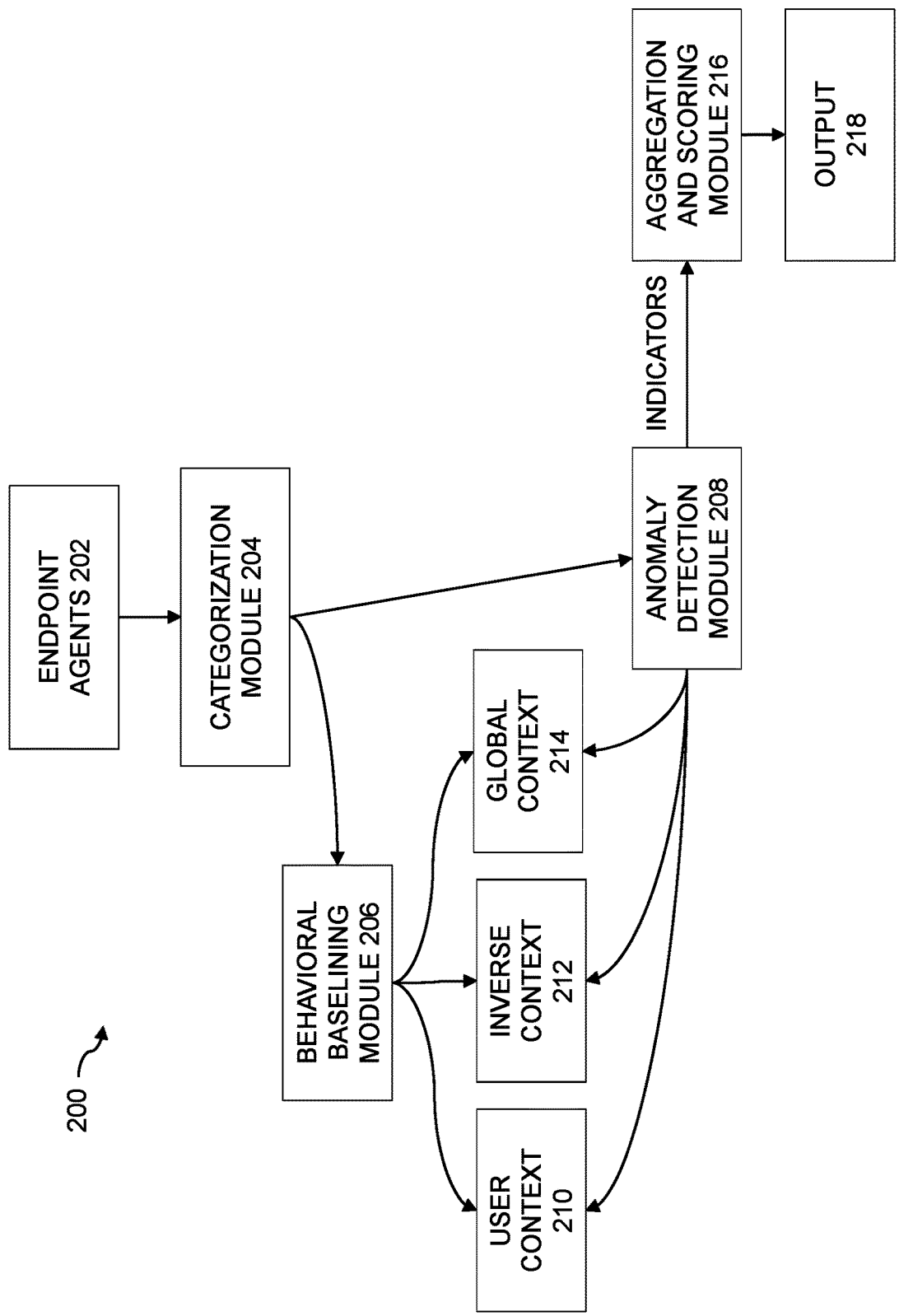
FIG. 2 shows an example detection framework in accordance with an illustrative embodiment.

Referring now to FIG. 2, this figure shows a simplified flow diagram of a detection framework 200 in accordance with an illustrative embodiment. The detection framework 200 includes one or more endpoint agents 202. Each endpoint agent 202 captures information related to, for example, process and registry activity from a given endpoint in a network (such as user devices 102), and attribute each event to a given user account. This information is provided to the categorization module 204. As a non-limiting example, the endpoint agents 202 may be software agents executing on user devices 102 which is streamed to the multi-context analysis system 105, for example.

The categorization module 204 categorizes events captured by one or more endpoint agents 202 to reflect their attribution to different components that may be compromised as part of an attack. The different components may be related to, for example, process events (e.g., using, running or opening an application(s), .exe files, etc.) and/or registry events (e.g., editing registry entries in an operating system). This unique type of categorization reflects research on an attacker's use of conventional tools. The use of categorization, over time, enables more tools to be added as the research evolves. For example, the categorization module 204 may categorize the events based on predefined rules and/or heuristics, where each category represents which types of threats are attributable to a given event.

In at least one example embodiment, the categorization module 204 enriches the information received from the endpoint agents 202. For example, the categorization module 204 may perform clustering and/or tagging operations on the events using, for example, an unsupervised machine learning technique. For instance, a single user within a corporate network may be associated with multiple user accounts, multiple machines, etc. Clustering and/or tagging the events associated with, for example, these multiple user accounts or multiple identifiers allows the behavior of a single user to be considered. A non-limiting example of a tagging operation includes tagging a particular user account as 'Administrator' or 'Service Account' depending on the type of privileges associated with the user account. In some example embodiments, the enrichment may include applying a predefined mapping such as, for example, mapping a user account to a particular group within an organization based on the name of the user account. The enrichment may be more complex, such as being based on one or more machine learning techniques.

According to at least one example embodiment, the categorization module 204 may normalize the events from various endpoint agents into a particular format. For example, each event may be transformed into a record according to a particular format. Each of these records may then be fed into one or more of the behavioral baselining module 206 and the anomaly detection module 208.

As a non-limiting example, consider a user that has historically authenticated from his PC into development machines named tiger-srv1, tiger-srv2 and tiger-srv3. Subsequently, the user authenticates into a machine named tiger-srv4 for the first time. Although this is the first time the user has authenticated with the tiger-srv4 machine, it is unlikely to be a security threat since tiger-srv4 probably belongs to the user's development team. One or more example embodiments allow the categorization module 204 to cluster the tiger-srv1, tiger-srv2, tiger-srv3 and tiger-srv4 machines using one or more rules, for example.

According to at least one embodiment, the categorization module 204 may create record from each event according to a specific schema. For example, if the event corresponds to a process event, then the categorization module 204 may create a record based on a schema that includes the following attributes (or fields):

eventId—unique event identifier
dateTime—logical date and time of the record dataSource—data source from which the record arrived
userId—unique user identifier
userName—unique username across all data sources and all schemas
userDisplayName—display name of the user
operationType—type of operation done by source process
machineId—normalized name of the machine
machineName—unique machine name across all schemas and all data sources
machineOwner—user owner of the machine
srcProcessDirectory—source process directory
srcProcessFilename—source process filename
srcProcessDirectoryGroups—group to which the source process directory belongs (e.g., all directories under C:\Windows\System32\ might be mapped to group system32)
srcProcessCategories—categories to which the process belongs (e.g., word.exe may be mapped to categories OFFICE and WORD_PROCESSOR)
srcProcessCertificateIssuer—source process certificate issuer
dstProcessDirectory—target process directory
dstProcessFilename—target process filename
dstProcessDirectoryGroups—groups to which the target process directory belongs (e.g., all directories under C:\Windows\System32\ might be mapped to group system32)
dstProcessCategories—categories to which the target process belongs (e.g., word.exe may be mapped to categories OFFICE and to WORD_PROCESSOR)
dstProcessCertificateIssuer—target process certificate issuer It is to be appreciated by those skilled in the art that the schema above is merely an example, and there may be, for example, fewer attributes, additional attributes, or different attributes depending on the implementation. Additionally, there may be different schemas defined for different types of events. For example, if an event is a process event, the categorization module 204 creates a new process schema event, and maps the required attributes from the original process event to the attributes defined in the process schema. For instance, if a process event includes attribute file.src=iexplorer.exe, then this attribute is mapped to srcProcessFilename=iexplorer.exe in the new process schema event. If the original event has additional attributes that are irrelevant to the corresponding schema, then these attributes may be ignored (i.e., these attributes are not mapped).

The behavioral baselining module 206 splits records obtained from the categorization module 204 into sub-models to form a behavioral baseline. For example, the behavioral baselining module 206 may duplicate and separate each event into a plurality of sub-models (e.g., 10 sub-models), where each sub-model reflects a single behavior. In some examples, at least some of the sub-models are built or re-built on a periodic basis (e.g., every 24 hours). The behavioral baselining module 206 measures each given behavior in the following three contexts:

1. A user context 210 that defines which values are commonly observed by a certain user for a particular behavior. The user context looks at activity from the user's point of view and determines 'normal' behavior based on available observations.
2. An inverse context 212 that defines which values are commonly observed by the opposing values of this behavior. This context generally looks at the activity from the host, process or registry key perspective to determine if the activity is abnormal for it.
3. A global context 214 that defines which values are commonly observed by the entire user population with respect to this model. This context generally provides an enterprise-level view of the observation and the activity to define how this operation is usually seen among all users.

The anomaly detection module 208 also duplicates and separates the events from the categorization module 204 into a plurality of sub-models (e.g., 10 sub-models). The anomaly detection module 208 compares new events to corresponding sub-models identified in the behavioral baselining module 206. For example, the sub-models may be scored in all three contexts 210, 212 and 214, resulting in the following three scores:

1. A user context score that defines which values are commonly observed by this user and this behavior.
2. An inverse context score that defines which values are commonly observed by the opposing values of this behavior.
3. A global context score that defines which values are commonly observed by the entire user population with respect to this model.

In this way, an overall score for a new event may be scored based on the context scores above to determine whether one or more values in the new event deviates from the corresponding one or more sub-models. If the score deviates from the sub-model, then the observation is annotated with a score reflecting the strength of that deviation. A deviation may reflect, for example, a statistical deviation (e.g., deviation from a Gaussian distribution), a rarity of a new occurrence within a closed or open set of parameters (e.g., a user logs into a new machine for the first time), or deviation from a normal working time (e.g., normal working hours of a user). By analyzing the multiple contexts 210, 212 and 214, common behaviors are eliminated from the models and the importance of an anomaly is emphasized on all three contexts 210, 212 and 214 in identifying a malicious activity. Each annotated score defines a single anomaly in a specific context in a specific sub-model, and results in a threat indicator being generated.

Figure 3A:
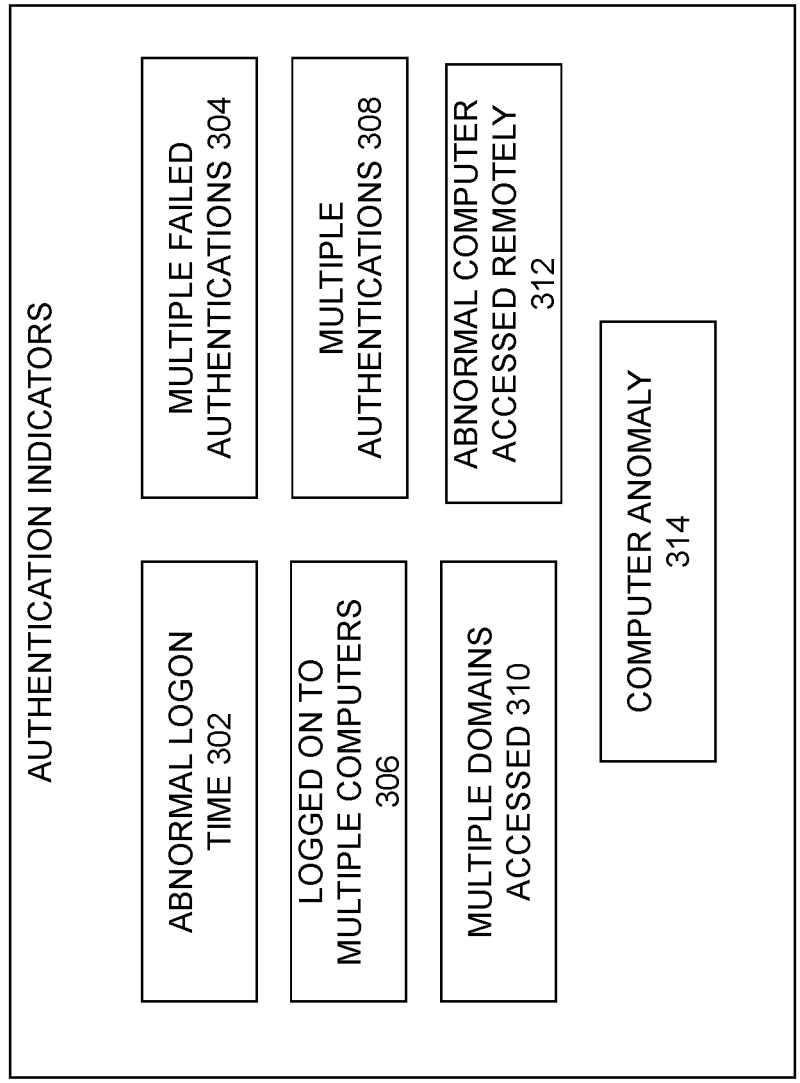
FIGS. 3A-3C show types of indicators for different schemas in accordance with one or more illustrative embodiments.
Figure 3B:
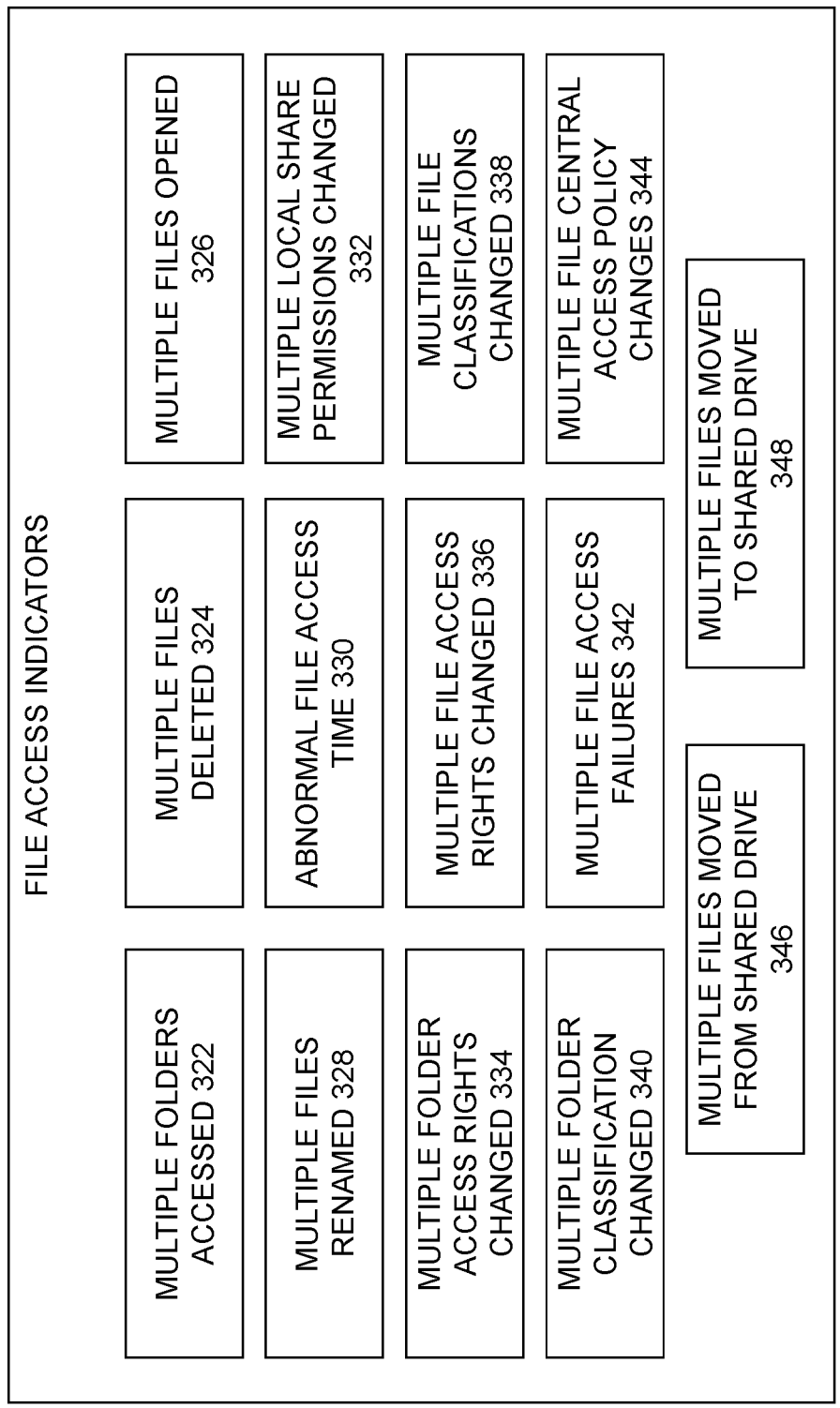
Figure 3C:
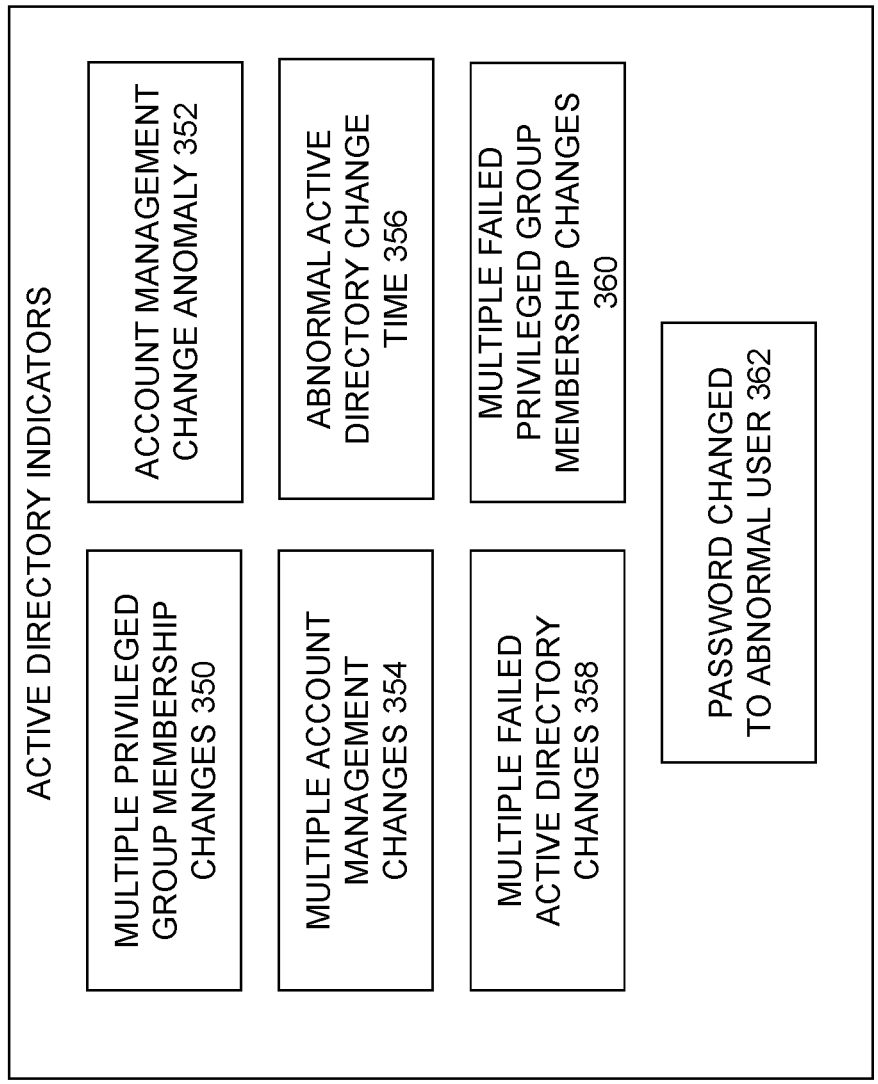

FIGS. 3A-3C illustrate some non-limiting examples of types of indicators for different schemas in accordance with one or more example embodiments. FIG. 3A shows indicators associated with an authentication schema which include, for example: abnormal logon time 302, multiple failed authentications 304, logged on to multiple computers 306, multiple authentications 308, multiple domains accessed 310, abnormal computer accessed remotely 312 and computer anomaly 314.

FIG. 3B shows indicators associated with a file access schema which include, for example: multiple folders accessed 322, multiple folders files deleted 324, multiple files opened 326, multiple files renamed 328, abnormal file access time 330, multiple local share permissions changed 332, multiple folder access rights changed 334, multiple file access rights changed 336, multiple file classifications changed 338, multiple folder classifications changed 340, multiple file access failures 342, multiple file central access policy changes 344, multiple files moved from shared drive 346 and multiple files moved to shared drive 348.

FIG. 3C shows indicators associated with an active directory schema which include, for example: multiple privileged group members changes 350, account management change anomaly 352, multiple account management changes 354, abnormal active directory change time 356, multiple failed directory changes 358, multiple failed privileged group membership changes 360 and password changed to abnormal user 362.

New indicators generated by the anomaly detection module 208 are sent to the aggregation and scoring module 216 which determines a unified entity score for all the indicators found in a specific time frame (e.g., an hour) for a specific user. Each of these entities is evaluated and scored again to find unique combinations of indicators.

In some example embodiments, the aggregation and scoring module 216 attaches weights to a given indicator to account for how noisy that indicator is. For example, a weight may account for how noisy a particular indicator is across an organization, or account for a correlation with other indicators (e.g., a correlation between "high number of file actions" and "high number of file open"). In some circumstances a weight for a given indicator is dynamic and is learned on a per-user basis. For example, if a user frequently exhibits abnormal behavior, then this behavior is learned and a lower priority weight is attached to the user. In other words, the user will need to have a more "extreme" activity in order for that behavior to be considered anomalous.

Further details regarding operations performed by the aggregation and scoring module 216 may be found in US Patent Pub. No. 2017/0126710A1 (issued as U.S. Pat. No. US 10,437,831 on Oct. 19, 2018), which is incorporated by reference herein in its entirety.

Entities with aggregated scores that satisfy a threshold may be stored and/or output 218 to, e.g., a graphic user interface which enables proactive, behavior-based, attacker threat hunting.

By way of example, a user context may indicate that a certain user has not failed an authentication in the last month. If the user subsequently fails authentication ten times in one day, then a user context score may be calculated to indicate this anomaly. However, if the global context indicates that many users perform this pattern (i.e., not having failed authentication, but then failing authentication ten times), then the score can be reduced. Alternatively, the score could be increased if the global context indicates this pattern does not occur frequently. As such, the prior distribution for the variance is determined based on the information of other users in the network, for example, per feature per mean.

As another example, consider a user in an organization authenticates into a machine for the first time, and assume this behavior is considered anomalous for the user based on the user context. If we look at this activity from the perspective of the machine (i.e., the inverse context), then it may indicate that many other users across the organization authenticated into this machine only a limited amount of times in the past. For this case, the initial score can be reduced as it is less likely to be an anomaly in view of the inverse context for this feature.

Figure 4:
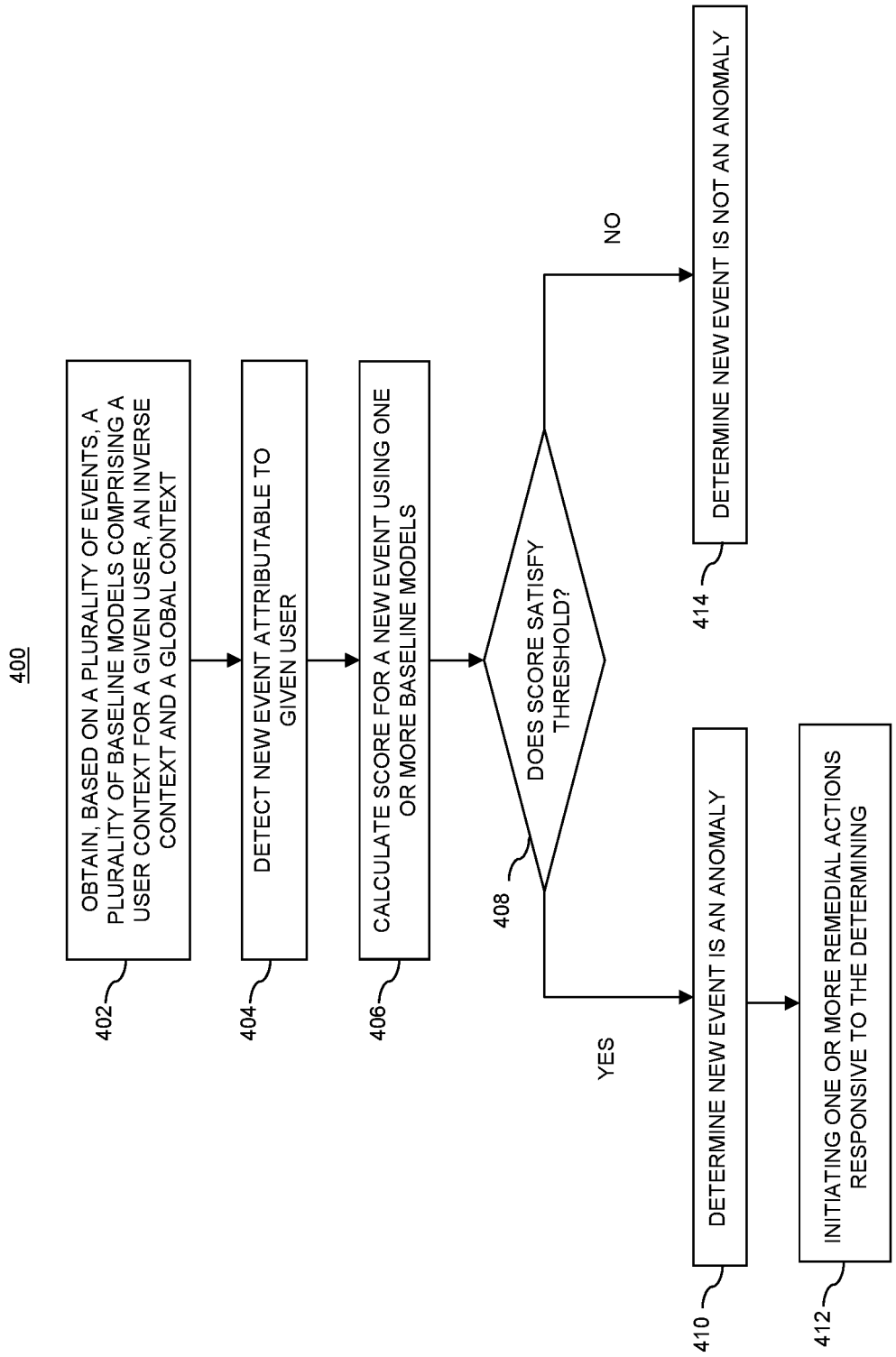
FIG. 4 shows a flow diagram of a process for detecting cyber attacker behavior in accordance with an illustrative embodiment.

FIG. 4 is a flow diagram of a process 400 for identifying attacker behavior in an illustrative embodiment. It is to be understood that this particular process is only an example, and additional or alternative processes can be carried out in other embodiments.

In this embodiment, the process 400 includes steps 402 through 414, where step 412 is optional. These steps are assumed to be performed by the processor 120 utilizing its modules 130, 132, 134 and 136.

Step 402 includes obtaining, based on a plurality of events associated with changes in one or more of a computer registry and a computer process, a plurality of baseline models comprising (i) a user context that represents normal behavior for at least a first subset of features associated with the plurality of events with respect to a given one of a plurality of users, (ii) at least one inverse context that represents normal behavior for at least one of the features with respect to a particular value of one or more features in the first subset, and (iii) a global context representing a behavior of the features across the plurality of the users. In at least one example, step 402 includes determining the one or more of the events that are attributable to the given user based on at least one identifier of the given user. Also, the score for the at least one new event may be based at least in part on the user context score, the inverse context score and the global context score. Each of at least a subset of the baseline models corresponds to at least one of: an authentication schema, for a given time period, comprising a set of features associated with one or more of: logon times, logon attempts, computers accessed and domains accessed; a file access schema, for a given time period, comprising a set of features associated with one or more of: logon times, folders accessed, files moved, files deleted, file access times, file access rights, domains accessed; and an active directory schema, for a given time period, comprising a set of features associated with one or more of: password changes, active directory changes, privileged group memberships, and account management changes. For example, each of the baseline models may reflect a single behavior.

Step 404 of FIG. 4 includes detecting at least one new event attributable to the given user.

Step 406 includes calculating a score for the at least one new event based at least in part on a comparison of the at least new one event to one or more of the baseline models. In some example embodiments, step 406 includes one or more of: calculating a user context score for the at least one new event indicative of a deviation of the at least one new event from the user context for the given user; calculating an inverse context score for the at least one new event indicative of a deviation of the at least one new event from the inverse context; and calculating a global context score for the at least one new event indicative of a deviation of the at least one new event from the global context. In one or more embodiments, the plurality of events and the at least one new event are received from software agents executing on one or more endpoints of a network.

Step 408 includes determining whether the score satisfies a threshold, and step 410 includes determining that the new event is an anomaly in case the score satisfies the threshold. Step 414 includes determining that the new event is not an anomaly in case the score does not satisfy the threshold at step 408. The threshold may be based at least in part on historical activity of the given user.

Step 412 includes performing one or more remedial actions, such as for example, restricting access of one or more accounts and one or more machines from accessing a network, files or folders; resetting or limiting permissions associated with a file or folder; initiating a step-up authentication with one or more additional authentication factors; quarantining one or more files or folders, and preventing one or more further actions from being executed associated with the user account or machine associated with the anomalous activity.

Additionally, the process may include one or more further steps. For example, the process may include assigning each of the plurality of events to one of a set of categories based on one or more predefined rules, wherein each category corresponds to at least one type of threat that is attributable to a given event. The process may include a step of enriching one or more of the plurality events by at least one of clustering and tagging the one or more of the plurality of events. Also, the process may include normalizing the features for the plurality of events and the at least one new event. The process may also include a step of updating at least a portion of the plurality of baseline models based on the at least one new event.

In a further variation, the process may include providing an indication of one or more of: the score of the at least one new event and one or more devices associated with the at least one new event to a graphical user interface.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments provide a user context which is used to identify user-centric analysis, which was no present in conventional approaches techniques available as endpoint-logs focus on gathering the host-identifier. One or more embodiments also are configured to improve the speed and efficiency of responding to an attack by enabling a security practitioner to proactively contact the subject user to validate a suspicion. In the case of service or system accounts, the active user context allows previously untraceable activities to be attributed to a human actor. Further, at least one example embodiment is configured for identifying malicious activity of a human actor by eliminating common behaviors from models and emphasizing the importance of an anomaly using multiple different contexts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
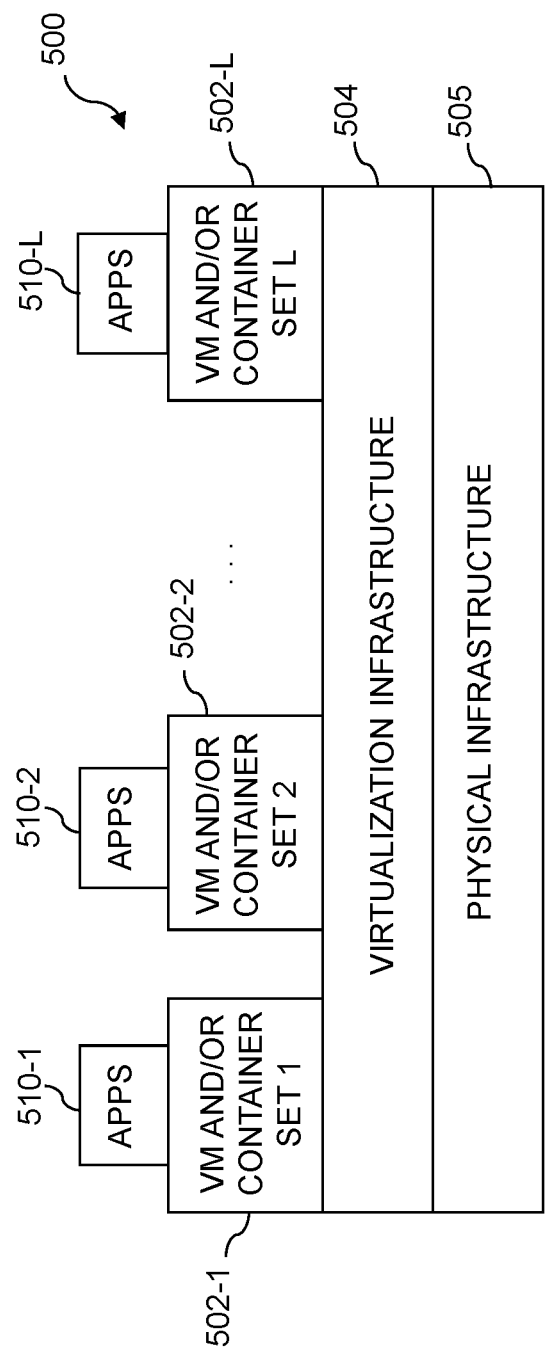
FIGS. 5 and 6 show examples of processing platforms that may be utilized to implement at least a portion of an information processing system in illustrative embodiments.
Figure 6:
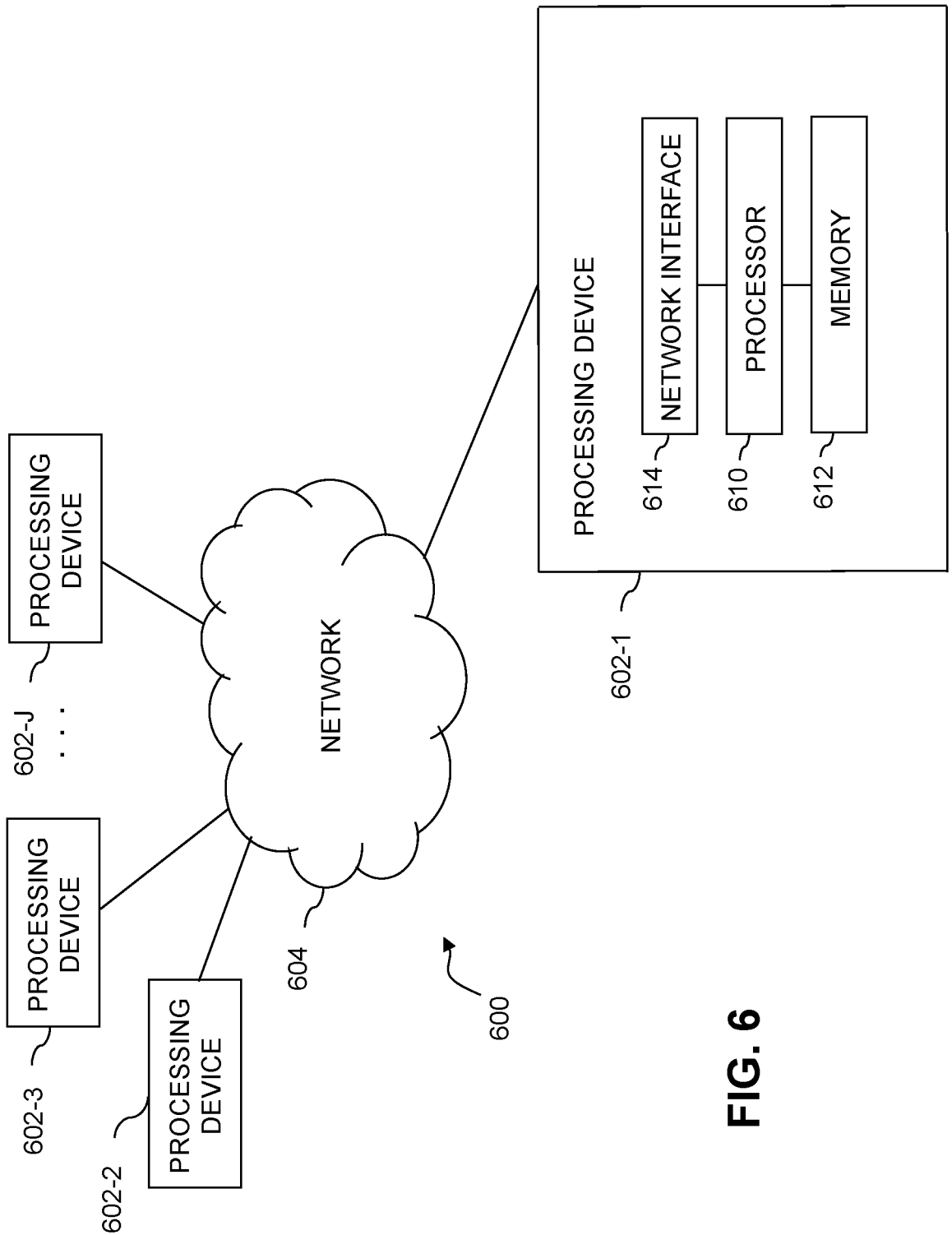

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-J, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, ASIC, a FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising VMs. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
receiving a plurality of events associated with changes in one or more of a computer registry and a computer process from software agents executing on a plurality of endpoints of a network;
attributing at least some of the plurality of events from at least two different endpoints of the plurality of endpoints to a given one of a plurality of users based at least in part on one or more user accounts associated with the given user;
obtaining a plurality of baseline models comprising (i) a user context that represents normal behavior for at least a first subset of features associated with the plurality of events with respect to the given user, (ii) at least one inverse context that represents normal behavior for at least one of the features with respect to a particular value of one or more features in the first subset, and (iii) a global context representing a behavior of the features across the plurality of the users;
detecting at least one new event attributable to the given user;
calculating a score for the at least one new event based at least in part on a comparison of the at least one new event to at least two of the baseline models;
determining that the at least one new event is an anomaly in response to the score satisfying a threshold; and
performing at least a portion of one or more remedial actions responsive to the determining,
wherein the method is performed by at least one processing device comprising a processor coupled to a memory.

2. The computer-implemented method of claim 1, comprising:
providing an indication of one or more of: the score of the at least one new event and one or more devices associated with the at least one new event to a graphical user interface.

3. The computer-implemented method of claim 1, comprising:
assigning each of the plurality of events to one of a set of categories based on one or more predefined rules, wherein each category corresponds to at least one type of threat that is attributable to a given event.

4. The computer-implemented method of claim 1, comprising:
enriching one or more of the plurality events by at least one of clustering and tagging the one or more of the plurality of events.

5. The computer-implemented method of claim 1, comprising:
normalizing the features for the plurality of events and the at least one new event.

6. The computer-implemented method of claim 1, wherein said calculating comprises one or more of:
calculating a user context score for the at least one new event indicative of a deviation of the at least one new event from the user context for the given user;
calculating an inverse context score for the at least one new event indicative of a deviation of the at least one new event from the at least one inverse context; and
calculating a global context score for the at least one new event indicative of a deviation of the at least one new event from the global context.

7. The computer-implemented method of claim 6, wherein the score for the at least one new event is based at least in part on the user context score, the inverse context score and the global context score.

8. The computer-implemented method of claim 1, wherein each of at least a subset of the plurality of baseline models corresponds to at least one of:
an authentication schema, for a given time period, comprising a set of features associated with one or more of: logon times, logon attempts, computers accessed and domains accessed;
a file access schema, for a given time period, comprising a set of features associated with one or more of: logon times, folders accessed, files moved, files deleted, file access times, file access rights, domains accessed; and
an active directory schema, for a given time period, comprising a set of features associated with one or more of: password changes, active directory changes, privileged group memberships, and account management changes.

9. The computer-implemented method of claim 1, wherein each of at least a subset of the plurality of baseline models reflects a single behavior.

10. The computer-implemented method of claim 1, wherein the threshold is based at least in part on historical activity of the given user.

11. The computer-implemented method of claim 1, comprising:
updating at least a portion of the plurality of baseline models based on the at least one new event.

12. A non-transitory processor-readable storage medium having stored therein program code of one or more software programs, wherein the program code when executed by at least one processing device causes the at least one processing device:
to receive a plurality of events associated with changes in one or more of a computer registry and a computer process from software agents executing on a plurality of endpoints of a network;
to attribute at least some of the plurality of events from at least two different endpoints of the plurality of endpoints to a given one of a plurality of users based at least in part on one or more user accounts associated with the given user;
to obtain a plurality of baseline models comprising (i) a user context that represents normal behavior for at least a first subset of features associated with the plurality of events with respect to the given user, (ii) at least one inverse context that represents normal behavior for at least one of the features with respect to a particular value of one or more features in the first subset, and (iii) a global context representing a behavior of the features across the plurality of the users;
to detect at least one new event attributable to the given user;
to calculate a score for the at least one new event based at least in part on a comparison of the at least one new event to at least two of the baseline models;
to determine that the at least one new event is an anomaly in response to the score satisfying a threshold; and
to perform at least a portion of one or more remedial actions responsive to the determining.

13. The non-transitory processor-readable storage medium of claim 12, wherein the program code when executed by at least one processing device further causes the at least one processing device:

to provide an indication of one or more of: the score of the at least one new event and one or more devices associated with the at least one new event to a graphical user interface.

14. The non-transitory processor-readable storage medium of claim 12, wherein the program code when executed by at least one processing device further causes the at least one processing device:

to assign each of the plurality of events to one of a set of categories based on one or more predefined rules, wherein each category corresponds to at least one type of threat that is attributable to a given event.

15. An apparatus comprising:

at least one processing device comprising a processor coupled to a memory;

the at least one processing device being configured:

to receive a plurality of events associated with changes in one or more of a computer registry and a computer process from software agents executing on a plurality of endpoints of a network;

to attribute at least some of the plurality of events from at least two different endpoints of the plurality of endpoints to a given one of a plurality of users based at least in part on one or more user accounts associated with the given user;

to obtain a plurality of baseline models comprising (i) a user context that represents normal behavior for at least a first subset of features associated with the plurality of events with respect to the given user, (ii) at least one inverse context that represents normal behavior for at least one of the features with respect to a particular value of one or more features in the first subset, and (iii) a global context representing a behavior of the features across the plurality of the users;

to detect at least one new event attributable to the given user;

to calculate a score for the at least one new event based at least in part on a comparison of the at least one new event to at least two of the baseline models;

to determine that the at least one new event is an anomaly in response to the score satisfying a threshold; and to perform at least a portion of one or more remedial actions responsive to the determining.

16. The apparatus of claim 15, wherein the at least one processing device is further configured to provide an indication of one or more of: the score of the at least one new event and one or more devices associated with the at least one new event to a graphical user interface.

17. The apparatus of claim 15, wherein the at least one processing device is further configured:

to update at least a portion of the plurality of baseline models based on the at least one new event.

18. The apparatus of claim 15, wherein each of at least a subset of the plurality of baseline models corresponds to at least one of:

an authentication schema, for a given time period, comprising a set of features associated with one or more of: logon times, logon attempts, computers accessed and domains accessed;

a file access schema, for a given time period, comprising a set of features associated with one or more of: logon times, folders accessed, files moved, files deleted, file access times, file access rights, domains accessed; and an active directory schema, for a given time period, comprising a set of features associated with one or more of: password changes, active directory changes, privileged group memberships, and account management changes.

19. The apparatus of claim 15, wherein each of at least a subset of the plurality of baseline models reflects a single behavior.

20. The apparatus of claim 15, wherein the threshold is based at least in part on historical activity of the given user.

* * * * *